United States Patent [19]

Chew

[11] Patent Number: 5,012,384

[45] Date of Patent: Apr. 30, 1991

[54] LOAD CIRCUIT FOR A DIFFERENTIAL DRIVER

[75] Inventor: Thomas Chew, San Francisco, Calif.

[73] Assignee: Advanced Micro Device, Inc., Sunnyvale, Calif.

[21] Appl. No.: 482,284

[22] Filed: Feb. 20, 1990

[51] Int. Cl.$^5$ ............................................. H01H 47/00
[52] U.S. Cl. ..................................................... 361/159
[58] Field of Search .................... 361/159; 307/31, 32, 307/270, 355

[56] References Cited

U.S. PATENT DOCUMENTS

| | | | |
|---|---|---|---|
| 4,795,920 | 1/1989 | Hechtman et al. ................ | 307/270 |
| 4,910,635 | 3/1990 | Gilliland ............................ | 361/159 |

Primary Examiner—J. R. Scott
Assistant Examiner—B. Johannssen
Attorney, Agent, or Firm—Foley & Lardner

[57] ABSTRACT

There is disclosed an improved output circuit for use with a differential line driver which drives a parallel inductance and resistance load coupled across the line driver output. The output circuit substantially reduces the kickback voltage produced across the load which results from a residual magnetizing current being stored in the load inductance. The output circuit includes an impedance means which is coupled across the output terminals and a common mode current source coupled between the impedance means and a common potential for sinking a portion of the residual magnetizing current to reduce the amount of residual magnetizing current flowing through the load resistance.

22 Claims, 5 Drawing Sheets

LOAD CIRCUIT FOR A DIFFERENTIAL DRIVER

BACKGROUND OF THE INVENTION

The present invention generally relates to an improved output circuit for use or with a differential line driver. The present invention more particularly relates to an improved output circuit which reduces kickback voltages produced by inductive loads coupled across the outputs of differential line drivers.

Differential line drivers are well known in the art and find many applications. One such application is in Ethernet Area Networks which include a main bus and which convey data packets in the form of Manchester encoded signals. These Manchester encoded signals are DC signals which have two levels, zero volt or minus two volts, for example. Differential line drivers serve the function in such networks to convert the DC Manchester encoded signals to AC signals.

The differential line drivers are used in tap transceivers which are stationed along the bus and are also used in serial interface adapters which, in one application, are coupled to the tap transceivers by a cable. Because the line drivers convert the DC signals to AC signals at their outputs, there is, except for one case, no net average DC level at their outputs. The only exception to this is in the case of an end of message (EOM) signal which is provided at the end of each data packet. The end of message signal is a positive voltage with a duration of two or three bit-times and is used to signal the end of a data packet.

The line driver of the tap transceiver is transformer coupled to the cable which, in turn, in accordance with the application referred to above, is transformer coupled to a serial interface adapter. The equivalent load to the line driver output includes a parallel coupled load inductance and a line termination load resistance across the line driver output terminals. During the normal transmission of a data packet, there is no average DC level at the line driver outputs. However, during the end of message signal, there is an average DC level which results in a residual magnetizing current in the load inductance. After the end of message signal is terminated, the residual magnetizing current flows through the load resistor causing an undershoot or kickback voltage of reverse polarity across the load resistance and, as a result, across the line driver output terminals. If this kickback voltage is too high, it could be falsely interpreted as the beginning of a new data packet. Obviously, such kickback voltages are undesirable.

Because such kickback voltages are undesirable, it is generally required to maintain the maximum magnitude of the kickback voltage to less than 100 millivolts. In order to meet this requirement, some line drivers have employed additional resistive loading across the line driver output terminals. Unfortunately, this limits the output voltage otherwise obtainable with these line drivers. Also, since the output inductance loading may vary depending upon the applications, some line drivers are not capable of meeting the kickback voltage requirement for all applications.

The present invention overcomes the aforementioned difficulties with respect to kickback voltage by providing an output circuit for a differential line driver which substantially reduces the kickback voltage. The output circuit of the present invention accomplishes this end by allowing only a portion of the residual magnetizing current to flow through the load resistance at the termination of an end of message signal. The output circuit of the present invention may be implemented externally to existing integrated circuit line drivers by employing discreet components, and, since the output circuit of the present invention incorporates integrated circuit processing compatible components, it may also be integrated into an integrated circuit along with the line driver with which it is associated.

SUMMARY OF THE INVENTION

The present invention provides an improved output circuit for use with a differential driver of the type adapted to drive a load including a parallel inductance and resistance coupled across a pair of output terminals of the driver. The driver is also of the type arranged to provide first and second equal currents at the terminals for deriving a zero volt output across the load when in a first state, and for providing a third current to one of the terminals for deriving a voltage magnitude across the load when in a second state. The third current causes a residual magnetizing current in the inductance which produces an undesired kickback voltage to be produced across the load resistance during the transition from the second state to the first state. The output circuit is arranged to substantially reduce the kickback voltage and includes impedance means coupled across the output terminals and common mode current source means coupled to the impedance means for sinking a portion of the residual magnetizing current during the transition to reduce the amount of the residual magnetizing current flowing through the load resistance during the transition.

The invention further provides an improved output circuit for use with a differential driver of the type adapted for use in a network including a bus for carrying data packets and of the type which employs an end of message level having a duration of multiple bit times at the end of a data packet. The driver also is of the type adapted to drive a load including a parallel inductance and resistance coupled across a pair of output terminals of the driver and is arranged to provide first and second equal currents at the terminals in the absence of the end of message level for deriving a zero volt output across the load and for providing a third current to one of the terminals in the presence of the end of message level for deriving a voltage magnitude across the load. The third current causes a residual magnetizing current in the inductance which produces an undesired kickback voltage to be produced across the load resistance when the end of message level is terminated. The output circuit is arranged to substantially reduce the kickback voltage and includes resistance means coupled across the output terminals and common mode current source means coupled between the resistance means and a common potential for sinking a portion of the residual magnetizing current after the end of message level is terminated to reduce the amount of the residual magnetizing current flowing through the load resistance to thereby correspondingly reduce the kickback voltage.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings, in the several figures of which like reference characters identify identical elements, and wherein:

DESCRIPTION OF THE PREFERRED EMBODIMENTS

Figure 1:
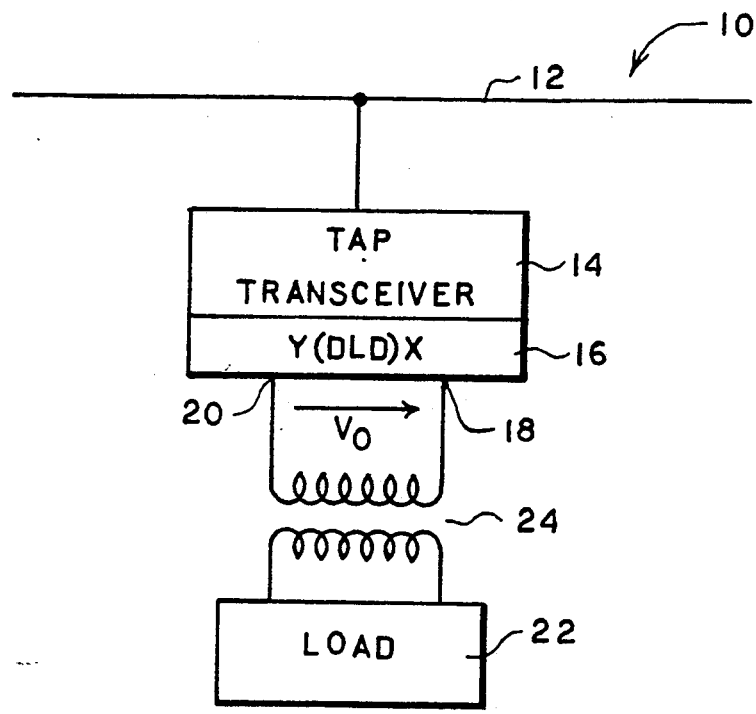
FIG. 1 is a schematic block diagram illustrating a prior art arrangement of a tap transceiver including a differential line driver in the context of an Ethernet-type Local Area Network.

Referring now to FIG. 1, it illustrates a typical prior art arrangement wherein a tap transceiver 14 is coupled to a bus 12 of a network 10 such as an Ethernet Local Area Network. Ethernet Local Area Networks are of the type which convey data packets across the network on the bus 12 in the form of Manchester encoded signals. The Manchester encoded signals are DC level digital signals. One function of the tap transceiver 14 is to translate the DC Manchester encoded signal data packets to AC signals. To accomplish this end, the tap transceiver includes a differential line driver 16 having an X output 18 and a Y output 20. As a result of the signal translation, the differential line driver 16 provides across its outputs 18 and 20 a differential signal which is an AC signal.

The outputs of the differential line driver 16 are coupled to a load 22 by a transformer 24 due to the AC signals provided across the outputs 18 and 20 of the differential line driver 16. The load 22, in one application, may be a cable which is in turn transformer coupled to a serial interface adapter of the type well known in the art. Serial interface adapters also generally include a differential line driver similar to the differential line driver 16 used in the tap transceiver 14.

By virtue of the transformer coupling of the differential line driver to the load 22, the differential line driver outputs 18 and 20 drive a parallel combination of a load inductance and a load resistance. The equivalent circuit of such a load is shown in FIG. 2.

Figure 2:
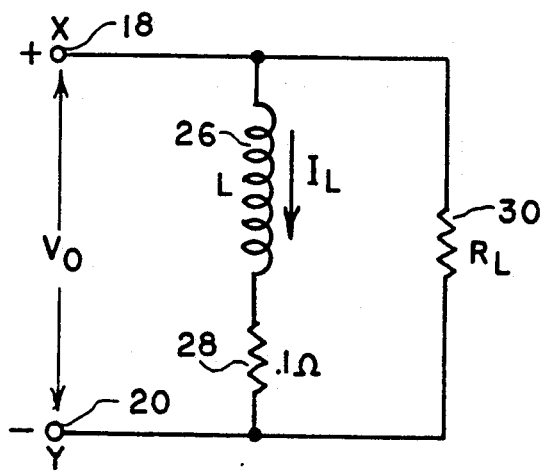
FIG. 2 is an equivalent circuit of a transformer load appearing across the output terminals of the differential line driver of the tap transceiver of FIG. 1.

Referring now to FIG. 2, it illustrates that across the X output 18 and Y output 20 is a load inductance 26 which is the inductance of the primary winding of the transformer 24. The load inductance also includes a series resistance 28 having a value on the order of 0.1 ohm. For purposes of describing the present invention, the series resistance 28 is ignored since it is of such a low value. In typical arrangements, the load inductance 26 may have a value on the order of 27 $\mu$H, 35 $\mu$H, or 50 $\mu$H, for example.

Coupled across the load inductance is an equivalent load resistance 30. The load resistance 30 may have a value on the order of 78 ohms.

The load inductance 26 and load resistance 30 are coupled in parallel and across the X output 18 and Y output 20 of the differential line driver 16. As will be seen hereinafter, the differential line driver 16 when in a first state, provides each of its output terminals 18 and 20 with a current, wherein each current is of equal value, so that the voltage derived across the outputs 18 and 20 is zero volts. In a second state, the differential line driver 16 provides one of its output terminals with a third current while sinking the third current through the other output terminal to derive a voltage across the load comprising the load inductance 26 and load resistance 30. The third current preferably has a value which is twice the value of the current provided to each of the terminals when the differential line driver is operating in the first state. For example, when in the second state, the differential line driver may provide a third current through the X terminal 18 and sink the third current through the Y terminal 20.

Figure 3:
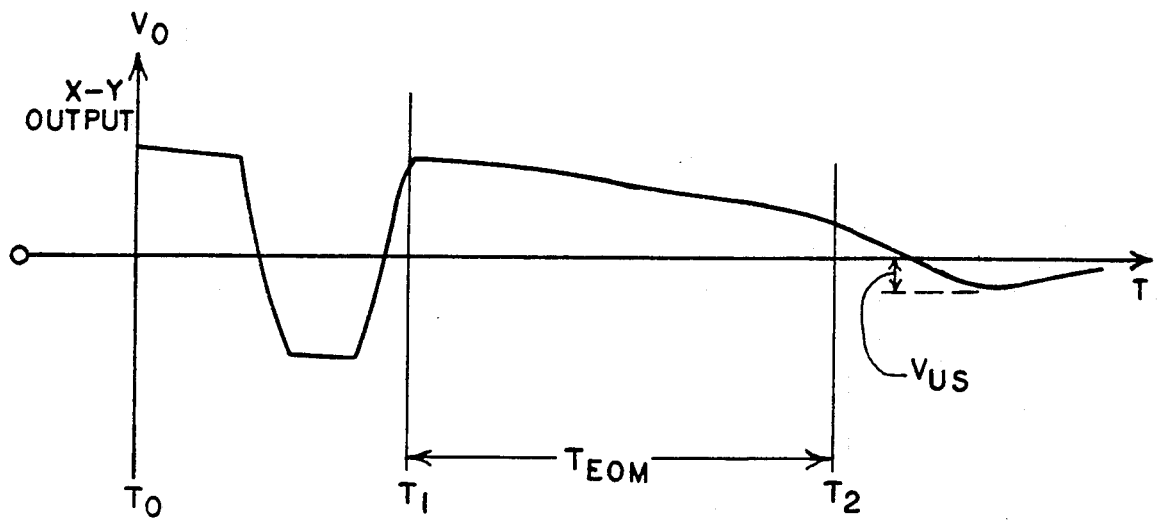
FIG. 3 is wave form illustrating an end of message signal appearing across the output of a differential line driver and a resulting kickback voltage.

Referring now to FIG. 3, it illustrates the output voltage across the X output terminal 18 and the Y output terminal 20 of the differential line driver 16 during the last bit of a data packet and a subsequent end of message signal. As will be noted in the Figure, during the last bit time interval of the data packet which extends from $t_0$ to $t_1$, the output voltage is symmetrical such that there is no average DC voltage across the differential line driver output. This is due to the fact that the tap transceiver 14 has translated the Manchester encoded DC signals to AC signals. The only exception to this is at the end of a data packet wherein an end of message signal level is present across the output terminals of the differential line driver. The purpose of the end of message signal is to signify that the transmission of the data packet has been completed and is represented by a substantially DC level for a duration of multiple bit time intervals such as two or three bit time intervals. The end of message signal level is shown in FIG. 3 between time $t_1$ and $t_2$. During this time, the differential line driver is operative in its second state to provide the end of message signal level across its outputs 18 and 20. At time $t_2$, the end of message signal is terminated and thereafter, the differential line driver enters its first state of operation for deriving a zero volt output across its outputs 18 and 20. As will be seen hereinafter, a kickback or undershoot voltage $V_{us}$ is generated across the differential line driver output during the transition of the differential line driver from its second state to its first state of operation. The kickback voltage results from a residual magnetizing current being established in the load inductance during the end of message signal which, during the transition, is forced through the load resistance to result in a reverse polarity kickback voltage.

As previously mentioned, the kickback voltage is undesirable because if it is too high in magnitude, it may be falsely interpreted as a valid start of another data packet. As a result, the IEEE standards require that the undershoot or kickback voltage be less than 100 millivolts.

Figure 4A:
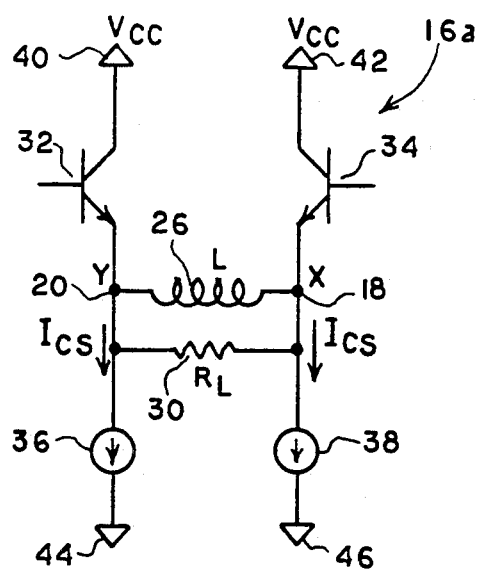
FIG. 4a is an equivalent circuit of a prior art differential line driver output stage illustrating its operation in a first state when providing a zero volt output across its output terminals.

Referring now to FIG. 4a, it illustrates the output stage 16a of a typical prior art differential line driver when operating in the first state to derive a zero volt output across its X output terminal 18 and its Y output terminal 20. The output stage 16a includes a first switching transistor 32, a second switching transistor 34, and current sources 36 and 38. The collectors of transistors 32 and 34 are coupled to a supply voltage ($V_{cc}$) at terminals 40 and 42 respectively. The emitter of transistor 32 is coupled to the Y output terminal 20 and the emitter of transistor 34 is coupled to the X output terminal 18. The equivalent current sources are shown connected between the output terminals and a common potential. To that end, the current source 36 is coupled between Y output terminal 20 and a common potential terminal 44 and the current source 38 is coupled between the X output terminal 18 and the common potential at terminal 46.

The bases of the switching transistors 32 and 34 are coupled to suitable switching bias supplies (not shown) which are of a type well known in the art. When the differential line drivers are operative in its first state, both transistors 32 and 34 are biased at their bases so that they are in an on condition. This causes first and second currents to be provided to the output terminals 18 and 20 which are of equal magnitude indicated as $I_{cs}$. Because the first and second currents are equal in magnitude, a zero voltage output is derived across the load comprising the load inductance 26 and the load resistance 30.

Figure 4B:
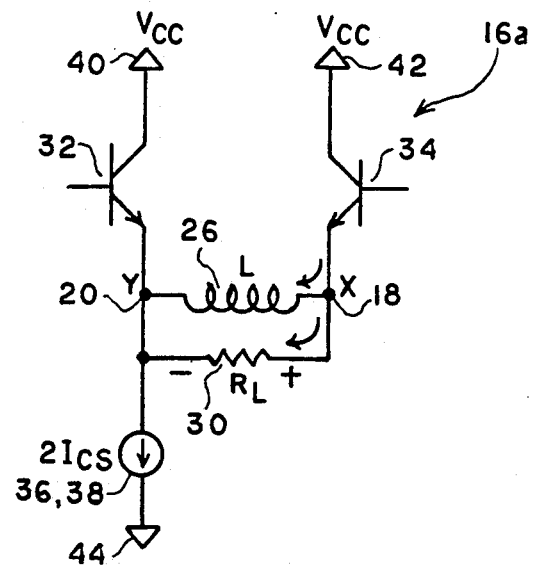
FIG. 4b is an equivalent circuit of the prior art differential line driver output stage of FIG. 4a illustrating its operation in a second state when providing a voltage output across its output terminals.

Referring now to FIG. 4b, it illustrates the operation of the output stage of the differential line driver when it is operative in its second state. When in the second state, transistor 32 is biased at its base into an off condition while transistor 34 is biased at its base into an on condition. This causes a third current to be provided to the X output terminal 18 which is then sinked through the Y output terminal 20 to common potential at terminal 44. The third current is provided by the combination of the current sources 36 and 38. The third current is thus illustrated as being provided the equivalent current source 36 and 38 having a magnitude of $2I_{cs}$. This results in a voltage potential across the X output terminal 18 and Y output terminal 20. Such a voltage is derived across the output during the end of message signal as illustrated in FIG. 3. As can be seen in FIG. 4b, all of the third current is directed through the load comprising the parallel combination of the load inductance 26 and the load resistance 30. During this time, the residual magnetizing current is stored in the load inductance.

Figure 4C:
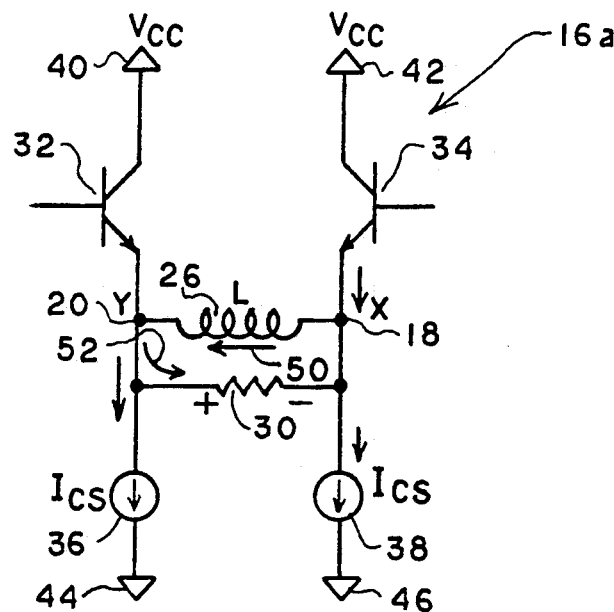
FIG. 4c is an equivalent circuit of the prior art differential line driver output stage of FIG. 4a illustrating its operation when in transition between the second state to the first state and more particularly, the manner in which the kickback voltage is caused across the line driver output terminals.

Referring now to FIG. 4c, it illustrates the operation of the output stage 16a of the differential line driver when the differential line driver is in transition from the second state illustrated in FIG. 4b to the first state illustrated in FIG. 4a. During this transition, both of the bases of transistors 32 and 34 are biased so that the transistors 32 and 34 are in an on condition. As a result, a current $I_{cs}$ is provided at each of the output terminals as previously illustrated in FIG. 4a. However, the residual magnetizing current represented by an arrow 50, which was stored during the end of message signal, flows from the load inductance 26 in the same direction as the third current provided the output load as illustrated in FIG. 4b. Since a current $I_{cs}$ is being conducted to the common potential at terminals 44 and 46, the residual magnetizing current 50 flows through the load resistance as indicated by the arrow 52. This results in a voltage drop across the load resistance 30 and a reversed polarity kickback voltage across the X output terminal 18 and Y output terminal 20. The kickback voltage remains until it is fully dissipated through the load resistance 30 in accordance with the time constant provided by the load inductance 26 and load resistance 30.

Figure 5:
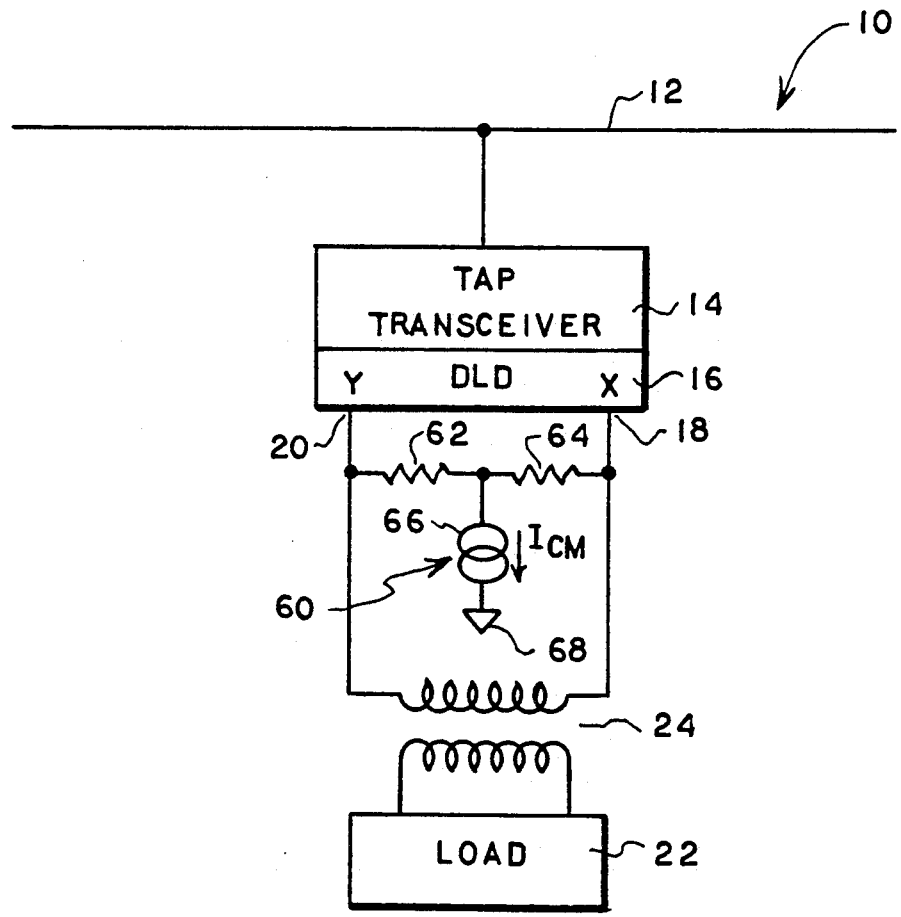
FIG. 5 is a schematic block diagram similar to FIG. 1 but illustrating an output circuit embodying the present invention at the output terminals of the tap transceiver differential line driver output terminals.

Referring now to FIG. 5, it illustrates the arrangement of FIG. 1 with the exception that an output circuit 60 embodying the present invention has been associated with the differential line driver 16. The output circuit 60 comprises an impedance means coupled across the output terminals wherein the impedance means comprises a resistance in the form of a first resistor 62 and a second resistor 64. The resistors 62 and 64 are coupled in series relation across the X output terminal 18 and Y output terminal 20. The output circuit 60 further includes a common mode current source 66 which is coupled to the impedance means comprising the resistors 62 and 64. More specifically, the common mode current source 66 is coupled between the common junction of resistors 62 and 64 and a common potential at a terminal 68.

The output circuit comprising resistors 62 and 64 and the common mode current source 66 may be coupled externally to the differential line driver 16 when the differential line driver 16 takes the form of an integrated circuit which does not incorporate the output circuit 60 of the present invention. In addition, as will be seen hereinafter, the output circuit 60 of the present invention includes integrated circuit processing compatible components so that the output circuit of the present invention may be integrated with the differential line driver in a single integrated circuit.

As will also be seen hereinafter, the output circuit 60 reduces the kickback voltage previously described by sinking a portion of the residual magnetizing current through the common mode current source 66. This results in reducing the amount of the residual magnetizing current flowing through the load resistance to in turn, and correspondingly, reduce the kickback voltage produced across the output terminals 18 and 20.

Figure 6:
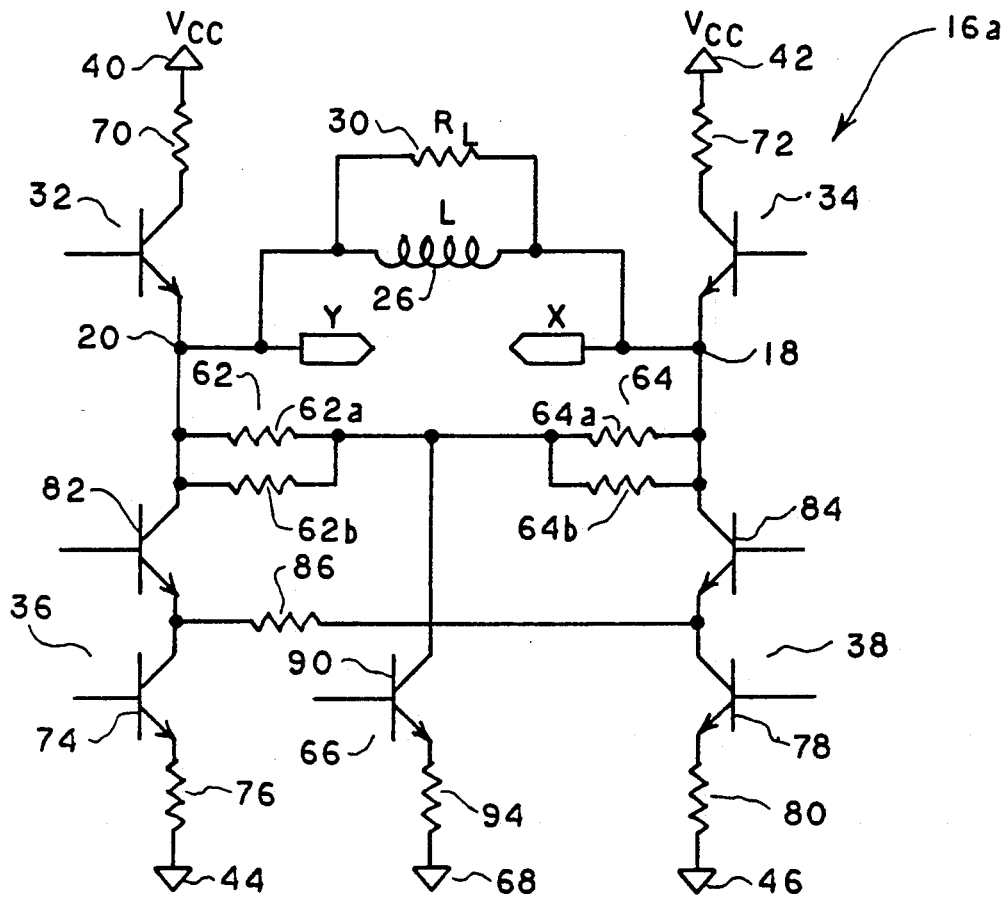
FIG. 6 is a schematic circuit diagram of an output stage of a typical differential line driver, but in addition, including an output circuit embodying the present invention.

Referring now to FIG. 6, it illustrates a more detailed schematic circuit representation of a differential line driver output stage 16a as previously described but which also includes an output circuit embodying the present invention. As will be noted in the Figure, the collector of transistor 32 is coupled to the power source terminal 40 through a short circuit protection resistor 70. Similarly, the collector of transistor 34 is coupled to the power source terminal 42 through a short circuit protection resistor 72. The current source 36 comprises a transistor 74 having an emitter coupled to the common potential terminal 44 through a resistor 76. Similarly, the current source 38 includes a transistor 78 having its emitter coupled to the common potential terminal 46 through a resistor 80. The bases of the transistors 74 and 78 are biased by biasing circuitry of a type well known in the art (not shown) so that each transistor 74 and 78 conducts a current equal to $I_{cs}$. The transistors 74 and 78 of current sources 36 and 38 respectively are coupled between switching transistors 32 and 34 and the common potential terminals 44 and 46 respectively by steering or switching transistors 82 and 84. The collector of transistor 82 is coupled to the output terminal 20 and similarly, the collector of transistor 84 is coupled to the output terminal 18. The emitter of transistor 82 is coupled to the collector of current source transistor 74 and similarly, the emitter of transistor 84 is coupled to the collector of current source transistor 78. The emitters of transistors 82 and 84 are also coupled together by a resistor 86.

The output circuit embodying the present invention includes a current source transistor 90, the first resistance 62, and the second resistance 64. The first resistance 62 includes a pair of parallel coupled resistors 62a and 62b. Similarly, the second resistance 64 includes a pair of parallel coupled resistors 64a and 64b. The parallel coupled resistors 62a, 62b and 64a, 64b are provided for implementing the output circuit in integrated circuit form. More specifically, the first resistance 62 and second resistance 64 are formed by the parallel combination of resistors so that all resistors can be made the same and for tracking purposes. If the output circuit embodying the present invention illustrated in FIG. 6 is to be implemented externally to the differential line driver, the first resistance 62 and second resistance 64 may be formed by single high precision resistors.

The collector of the common mode current source transistor 90 is coupled to the common junction of the first resistance 62 and the second resistance 64. The emitter of transistor 90 is coupled to common potential at the terminal 68 through a resistor 94. The base of transistor 90 is biased by biasing circuitry (not shown) for causing transistor 90 to conduct a common mode current having a magnitude referred to herein as $I_{cm}$.

When the differential line driver is operative in its first state, that is, when the differential line driver provides a zero voltage output across its output terminals 18 and 20, transistors 32 and 34 are biased into an on condition as previously described, transistors 82 and 84 are biased into an on condition and transistors 74 and 78 are biased at their bases so that each conducts a current equal to $I_{cs}$. As a result, each of the output terminals 18 and 20 is provided with a current equal to $I_{cs}$ so that there is no potential drop across the load inductance 26 and load resistance 30.

When the differential line driver is operative in its second state, that is, when it derives a voltage across its output terminals 18 and 20, transistor 32 is biased into an off condition, transistor 34 is biased into an on condition, transistor 82 is biased into an on condition, transistor 84 is biased into an off condition, and transistors 74 and 78 each are biased so that each conducts a current equal to $I_{cs}$. As a result, a current equal to $2I_{CS}$ flows through the emitter of transistor 34, through the load comprising the load inductance 26 and load resistance 30, through output terminal 20, through transistor 82, and then is branched at the emitter of transistor 82 so that $I_{cs}$ is conducted through transistor 74 and $I_{cs}$ is also conducted through resistor 86 and transistor 78.

During both the first and second states of operation, transistor 90 is biased for conducting the common mode current $I_{cm}$. As will be seen with respect to the equivalent circuit diagrams of FIGS. 7a, 7b and 7c, the common mode current source comprising transistor 90 serves to sink a portion of the residual magnetizing current stored in load inductance 26 during the transition from the second state to the first state of the differential line driver.

Figure 7A:
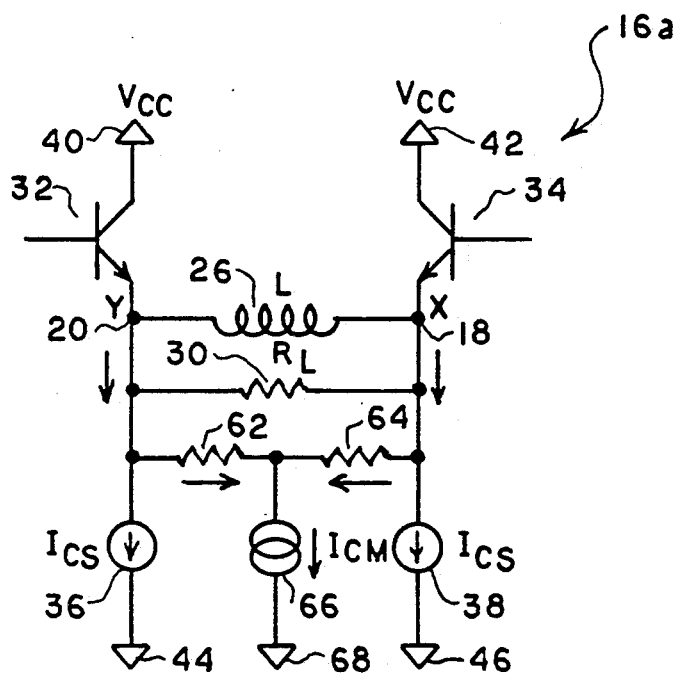
FIG. 7a is an equivalent circuit of the line driver output stage of FIG. 6 illustrating its operation in a first state when providing a zero volt output across its output terminals.

Referring now to FIG. 7a, it illustrates the differential line driver when operative in its first state. As can be noted from the Figure, current sources 36 and 38 are each conducting a current $I_{cs}$ such that there is no voltage drop across the output load including the load inductance 26 and the load resistance 30. Common mode current source 66 is conducting the common mode current $I_{cm}$. Since the resistances 62 and 64 are of the same resistance, the same amount of current is being conducted through the output terminals 18 and 20. Hence, there is no voltage drop across the output terminals 18 and 20 of the differential line driver.

Figure 7B:
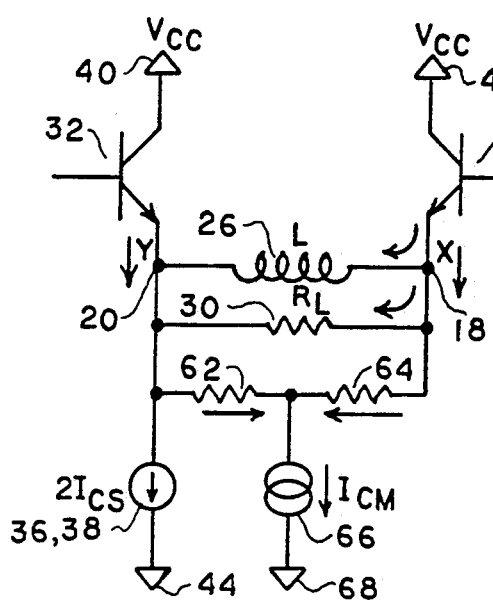
FIG. 7b is an equivalent circuit of the differential line driver output stage of FIG. 6 illustrating its operation in a second state when providing a voltage output across its output terminals.

Referring now to FIG. 7b, it illustrates the operation of the differential line driver employing the output circuit embodying the present invention when operating in the second state for providing a voltage across the X output terminal 18 and Y output terminal 20. As can be seen from the Figure, a current $2I_{cs}$ is being conducted to common potential terminal 44 by virtue of transistor 32 being biased off and transistor 34 being biased on. The current flows from the emitter of transistor 34, through output terminal 18, through the output load comprising load inductance 26 and load resistance 30 to output terminal 20, and to the common potential terminal 44. Common mode current source 66 conducts a common mode current $I_{cm}$ to the common potential terminal 68. If resistances 62 and 64 are of equal resistance, the common mode current source 66 can be designed so that it does not affect the $2I_{cs}$ current flowing through the output load. As a result, a voltage magnitude is produced across the output terminals 18 and 20 of the differential line driver.

Figure 7C:
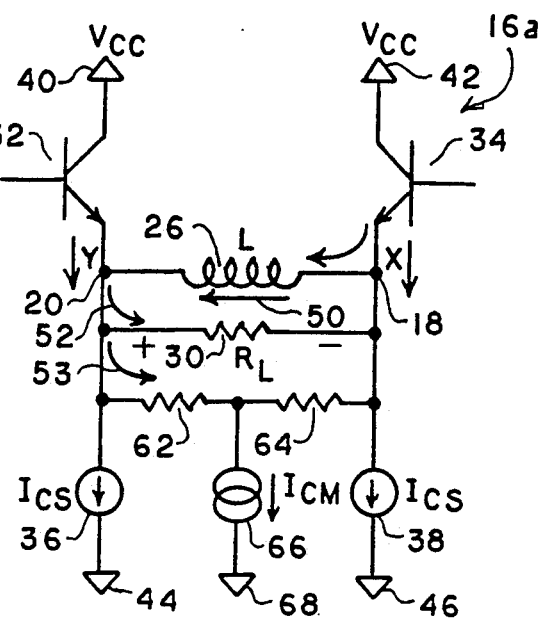
FIG. 7c is an equivalent circuit of the differential line driver output stage of FIG. 6 illustrating its operation when in transition between the second state to the first state and more particularly, the manner in which the kickback voltage across the line driver output terminals is substantially reduced in accordance with the present invention.

Referring now to FIG. 7c, it illustrates the operation of the differential line driver employing the output circuit of the present invention during the transition of the differential line driver from the second state as illustrated in FIG. 7b to the first state illustrated in FIG. 7a which occurs when an end of message signal level is terminated. As shown in FIG. 7c, transistors 32 and 34 are each biased into an on condition so that each output terminal 18 and 20 is provided with a current $I_{cs}$ from current sources 36 and 38. The common mode current source 66 continues to conduct the common mode current $I_{cm}$. As also shown, the residual magnetizing current 50 flows from the inductance 26 into the output terminal 20. In contrast to the differential line driver operation illustrated in FIG. 4c, the residual magnetizing current 50 is divided so that only a portion of the residual magnetizing current flows through the load resistance 30. The remaining portion of the residual magnetizing current flows through the resistance 62 and is sinked by the common mode current source 66. Because only a portion of the residual magnetizing residual current flows through the load resistance 30, a reduced kickback voltage will appear across the output terminals 18 and 20.

By virtue of the output circuit of the present invention, the kickback voltage may be significantly reduced. For example, in a differential line driver wherein $I_{cm}$ is equal to 6 milliamps, wherein the load inductance is on the order of 35 $\mu$H, and wherein the load resistance is on the order of 78 ohms, reduction in the kickback voltage can be realized from 100 millivolts to 60 millivolts when the common mode current source provides 1.3 milliamps. In this specific example, the resistances 62 and 64 are preferably each equal to 200 ohms. Hence, by virtue of the present invention, the kickback voltage may be reduced on the order of 40%.

Such a significant reduction in kickback voltage can make a differential line driver which is marginal with respect to the kickback voltage requirement operate well within the kickback voltage requirement with considerable tolerance. Furthermore, a differential line driver employing the output circuit of the present invention, by virtue of the substantially reduced kickback voltage may be employed under a variety of different load inductance and load resistance conditions while not exceeding the 100 millivolt kickback limitation. Furthermore, the output circuit of the present invention may be incorporated externally to any existing differential line driver. In addition, the output circuit of the present invention provides a common mode load which exhibits an incremental change in discharging the residual magnetizing current which is twice that of prior art implementations for the same minimum differential line driver output voltage. The only requirement is that, in practicing the present invention in accordance with the embodiment illustrated in FIGS. 5 through 7, the first and second resistances be made substantially equal in resistance.

Figure 8:
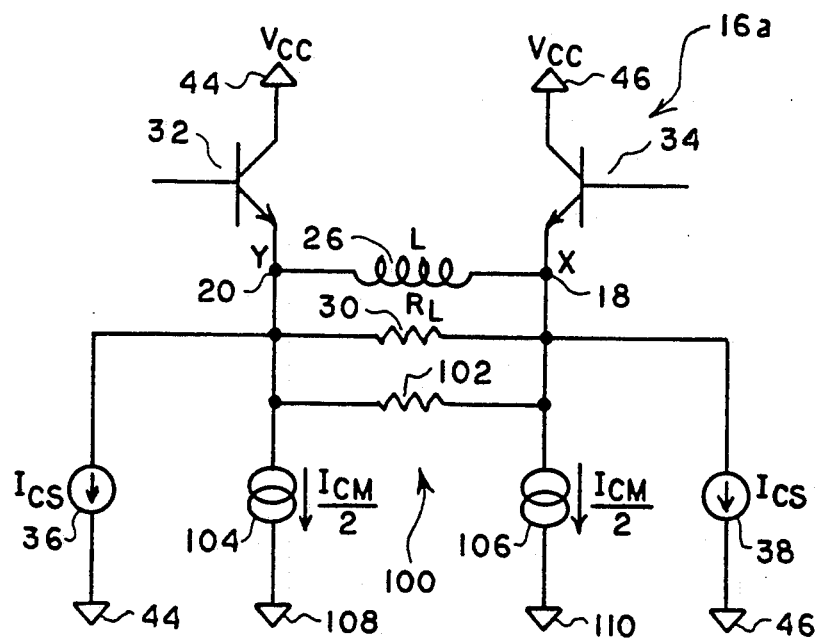
FIG. 8 is a schematic circuit diagram of a differential line driver output stage with an output circuit embodying the present invention in accordance with a second embodiment thereof.

Referring now to FIG. 8, it illustrates the output stage 16a of a differential line driver as previously described employing an output circuit structured in accordance with an additional embodiment of the present invention. In this embodiment, the output circuit 100 includes a resistor 102, a first common mode current source 104, and a second common mode current source 106. As can be noted in the Figure, the impedance means of the output circuit coupled across the output terminals 18 and 20 comprises a single resistor 102 and the common mode current source means comprises the first common mode current source 104 and the second common mode current source 106. The current sources 104 and 106 are each arranged to conduct a current equal to $\frac{1}{2}I_{cm}$. The current source 104 is coupled from the output terminal 20 to a common potential terminal 108 and the current source 106 is coupled between the output terminal 18 and a common potential terminal 110. The resistor 102 preferably is of a value which is twice the resistance of the first or second resistances 62 and 64 as previously described. This embodiment of the present invention is equivalent to the previously disclosed embodiment in that the portion of the residual magnetizing current which does not flow through the load resistance is divided between the current sources 104 and 106. As a result, output circuit 100 embodying the present invention of FIG. 8 also serves to significantly reduce the kickback voltage occurring across the output terminals of a differential line driver as it makes the transition from the second state to the first stage after the termination of an end of message signal.

While particular embodiments of the present invention have been shown and described, modifications may be made, and it therefore intended to cover all such changes and modifications which fall within the true spirit and scope of the appended claims.

What is claimed is:

1. An improved output circuit for use with a differential driver of the type adapted to drive a load including a parallel inductance and resistance coupled across a pair of output terminals of said driver, said driver being arranged to provide first and second equal currents at said terminals for deriving a zero volt output across said load when in a first state, and for providing a third current to one said terminal for deriving a voltage magnitude across said load when in a second state, said third current causing a residual magnetizing current in said inductance which produces an undesired kickback voltage to be produced across load resistance during the transition from said second state to said first stage, said output circuit being arranged to substantially reduce said kickback voltage and comprising:

impedance means coupled across said output terminals; and common mode current source means coupled to said impedance means for sinking a portion of said residual magnetizing current during said transition to reduce the amount of said residual magnetizing current flowing through said load resistance during said transition.

2. A circuit as defined in claim 1 wherein said impedance means comprises first and second series coupled impedances.

3. A circuit as defined in claim 2 wherein said common mode current source means is coupled between the common junction of said first and second impedances and a common potential.

4. A circuit as defined in claim 3 wherein said common mode current source means comprises a single current source.

5. A circuit as defined in claim 3 wherein said first and second impedances are first and second resistances respectively.

6. A circuit as defined in claim 5 wherein said first and second resistances are of equal value.

7. A circuit as defined in claim 1 wherein said driver is implemented in an integrated circuit and wherein said output circuit is external to said integrated circuit.

8. A circuit as defined in claim 1 wherein said driver is implemented in an integrated circuit and wherein said output circuit is integrated into said integrated circuit with said driver.

9. A circuit as defined in claim 8 wherein said impedance means comprises first and second series coupled resistances and wherein said current source means in coupled between the common junction of said first and second resistances and a common potential.

10. A circuit as defined in claim 9 wherein said first and second resistances each comprise a pair of parallel coupled resistors.

11. A circuit as defined in claim 9 wherein said common mode current source means comprises a single current source.

12. A circuit as defined in claim 1 wherein said impedance means comprises a resistance.

13. A circuit as defined in claim 12 wherein said common mode current source means comprises a first common node current source coupled between one of said output terminals and a common potential and a second common node current source coupled between the other said output terminal and said common potential.

14. An improved output circuit for use with a differential driver of the type adapted for use in a network including a bus for carrying data packets, and of the type which employs an end of message level having a duration of multiple bit times at the end of a data packet, said driver also being of the type adapted to drive a load including parallel inductance and resistance coupled across a pair of output terminals of said driver, said driver being arranged to provide first and second equal currents at said terminals in the absence of said end of message level for deriving a zero volt output across said load and for providing a third current to one of said terminals in the presence of said end of message level for deriving a voltage magnitude across said load, said third current causing a residual magnetizing current in said inductance which produces an undesired kickback voltage to be produced across said load resistance when said end of message level is terminated, said output circuit being arranged to substantially reduce said kickback voltage and comprising:

resistance means coupled across said output terminals; and common mode current source means coupled between said resistance means and a common potential for sinking a portion of said residual magnetizing current after said end of message level is terminated to reduce the amount of said residual magnetizing current flowing through said load resistance to thereby correspondingly reduce said kickback voltage.

15. A circuit as defined in claim 14 wherein said driver is implemented in an integrated circuit and wherein said output circuit is external to said integrated circuit.

16. A circuit as defined in claim 14 wherein said driver is implemented in an integrated circuit and wherein said output circuit is integrated into said integrated circuit with said driver.

17. A circuit as defined in claim 14 wherein said resistance means comprises first and second series coupled resistances.

18. A circuit as defined in claim 17 wherein said first and second resistances are of equal value.

19. A circuit as defined in claim 17 wherein said first and second resistances each comprise a pair or pairs of parallel coupled resistors.

20. A circuit as defined in claim 17 wherein said common mode current source means is coupled between the common junction of said first and second resistances and said common potential.

21. A circuit as defined in claim 20 wherein said common mode current source means comprises a single current source.

22. A circuit as defined in claim 14 wherein said common mode current source means comprises a first common node current source coupled between one of said output terminals and said common potential and a second common node current source coupled between the other said output terminal and said common potential.

* * * * *